(12) United States Patent  (10) Patent No.: US 7,850,221 B2
Nakata et al.  (45) Date of Patent: Dec. 14, 2010

(54) COWLING STRUCTURE FOR MOTORCYCLE

(75) Inventors: Masato Nakata, Wako (JP); Takanori Okuma, Wako (JP); Shinichi Kokubu, Wako (JP); Hiromasa Yamaguchi, Wako (JP); Yasushi Sato, Wako (JP); Hiroto Yoshiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/776,803

(22) Filed: Jul. 12, 2007

(65) Prior Publication Data

US 2008/0012391 A1 Jan. 17, 2008

(30) Foreign Application Priority Data

Jul. 14, 2006 (JP) .............................. 2006-194453

(51) Int. Cl.
 *B62D 61/02* (2006.01)
(52) U.S. Cl. .................... 296/78.1; 296/191; 296/181.2
(58) Field of Classification Search ............. 296/180.1, 296/78.1, 77.1, 91, 181.5, 191; 108/219, 108/68, 229, 225
See application file for complete search history.

(56) References Cited

U.S. PATENT DOCUMENTS

| 6,588,529 B2 * | 7/2003 | Ishii et al. .................... 180/219 |
| 6,709,042 B2 * | 3/2004 | Takemura et al. .......... 296/78.1 |
| 7,325,853 B2 * | 2/2008 | Tsukui et al. .............. 296/78.1 |

FOREIGN PATENT DOCUMENTS

| CN | 1167571 C | 9/2004 |
| EP | 1 514 782 A2 | 3/2005 |
| JP | 64-393 Y2 | 1/1989 |
| JP | 4028691 B2 | 12/2007 |

* cited by examiner

*Primary Examiner*—Glenn Dayoan
*Assistant Examiner*—Melissa A Black
(74) *Attorney, Agent, or Firm*—Westerman, Hattori, Daniels & Adrian, LLP (57) ABSTRACT

A cowling structure is provided for a motorcycle in which a radiator is disposed behind a front wheel of the motorcycle. The cowling structure includes a main cowling and a sub cowling. The main cowling covers a periphery of the radiator from the front of a handlebar. The sub cowling is provided in the rear of the cowling through a space. The sub cowling is separate from the cowling. The cowling structure allows wind to effectively hit a radiator, and reduces a force necessary for inclining a vehicle body at the time of cornering.

4 Claims, 8 Drawing Sheets

COWLING STRUCTURE FOR MOTORCYCLE

FIELD OF THE INVENTION

The present invention relates to an improvement of the cowling structure for a motorcycle.

BACKGROUND OF THE INVENTION

As the related cowling structure for a motorcycle, there has been known the cowling structure which includes a fairing and an under cowl. See, for example, JP-Y No. S64-393 (JP'393).

JP'393 illustrates a motorcycle 60 in which a front portion of a handlebar 64 is covered with a fairing 2 and a lower portion of an engine 65 is covered with an under cowl 70 that is disposed below the fairing 2. When a radiator is provided on the motorcycle 60 with the engine 65 as a water-cooled engine, for example, an opening portion defined between the fairing 2 and the under cowl 70, behind a front wheel 63 and in front of the engine 65 is convenient for disposing the radiator. In such position, however, the introduction of wind into the radiator using the fairing 2 or straightening of exhaust wind passing through the radiator using the under cowl 70 is hardly performed, and it is impossible to allow the wind to effectively hit the radiator.

Therefore, it may be possible to provide, for example, the structure in which the fairing 2 or the under cowl 70 is extended and the fairing 2 and the under cowl 70 are continuously and integrally formed so as to cover the radiator from the side. In this case, however, the area in side view of the integrally formed fairing 2 and under cowl 70 is increased, the air resistance is increased when the vehicle body is inclined in the lateral direction during traveling of the motorcycle 60 and hence, for example, there arises a tendency that a force necessary for inclining the vehicle body at the time of cornering is increased.

Accordingly, it is an object of the present invention to allow wind to effectively hit a radiator, and reduce a force necessary for inclining a vehicle body at the time of cornering by improving the cowling structure for a motorcycle.

SUMMARY OF THE INVENTION

To achieve the above-mentioned objectives, one aspect of the present invention provides a motorcycle with a radiator disposed behind a front wheel thereof, including a cowling for covering the periphery of the radiator from the front of a handlebar, a sub cowling that is a separate body from the cowling is provided in the rear of the cowling through a space.

Accordingly, as advantageous effects of the above-described invention, since the sub cowling is provided in the rear of the cowling for covering the periphery of the radiator, the exhaust wind passing through the radiator is straightened by the sub cowling, and the flow velocity of the wind passing through the radiator is increased. Also, the sub cowling is provided in the rear of the cowling through the space, and therefore, when inclining the vehicle body during traveling of the motorcycle, the wind is released in the lateral direction of the vehicle body through the space, thereby reducing the air resistance.

Moreover, since the sub cowling that is a separate body from the cowling is provided in the rear of the cowling through a space, when the vehicle body is inclined in the lateral direction at the time of cornering, the wind is released in the lateral direction of the vehicle body through the space. Therefore, the air resistance can be reduced, and the inclining in the lateral direction of the vehicle body can be performed with a smaller force. Also, even when the projected area of the side face of the cowling for covering the periphery of the radiator is reduced, the exhaust wind passing through the radiator can be straightened by the sub cowling, and the flow velocity of the wind passing through the radiator is increased, thereby allowing the wind to effectively hit the radiator.

According to another aspect of the present invention, the sub cowling is disposed on a lower portion of the vehicle body, and in that a vehicle body front portion of the sub cowling is disposed with a portion thereof overlapped with a lower portion of the cowling in side view below the radiator.

Thus, as an advantageous effect of the above-described invention, the exhaust wind passing through the radiator to flow around the lower portion of the vehicle body smoothly flows from a cowling side to a sub cowling side, thereby further promoting straightening.

Moreover, the sub cowling is disposed on a lower portion of the vehicle body, and the vehicle body front portion of the sub cowling is disposed with a portion thereof overlapped with a lower portion of the cowling in side view below the radiator. Thus, the exhaust wind passing through the radiator to flow around the lower portion of the vehicle body can be allowed to smoothly flow from a cowling side to a sub cowling side, thereby enhancing straightening effect and further reducing the air resistance during traveling.

According to another aspect of the present invention, the sub cowling is disposed in front of foot portions of a rider, and is inclined to be disposed so that a distance from a vehicle width center is increased gradually from the front of the vehicle body to the rear thereof.

Thus, as an advantageous effect of the above-described invention, the exhaust wind passing through the radiator is directionally changed to be directed gradually away from the vehicle body by the sub cowling disposed in front of the foot portions of the rider, thereby preventing the exhaust wind passing through the radiator from hitting the foot portions of the rider.

Moreover, the sub cowling is disposed in front of the foot portions of the rider, and is inclined to be disposed so that the distance from the vehicle width center is increased gradually from the front of the vehicle body to the rear thereof. Thus, it is possible to prevent the exhaust wind passing through the radiator from hitting the foot portions of the rider.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the present invention will be described hereinafter with reference to the accompanying drawings. Here, the drawings are viewed in the same direction as the numerals.

Figure 1:
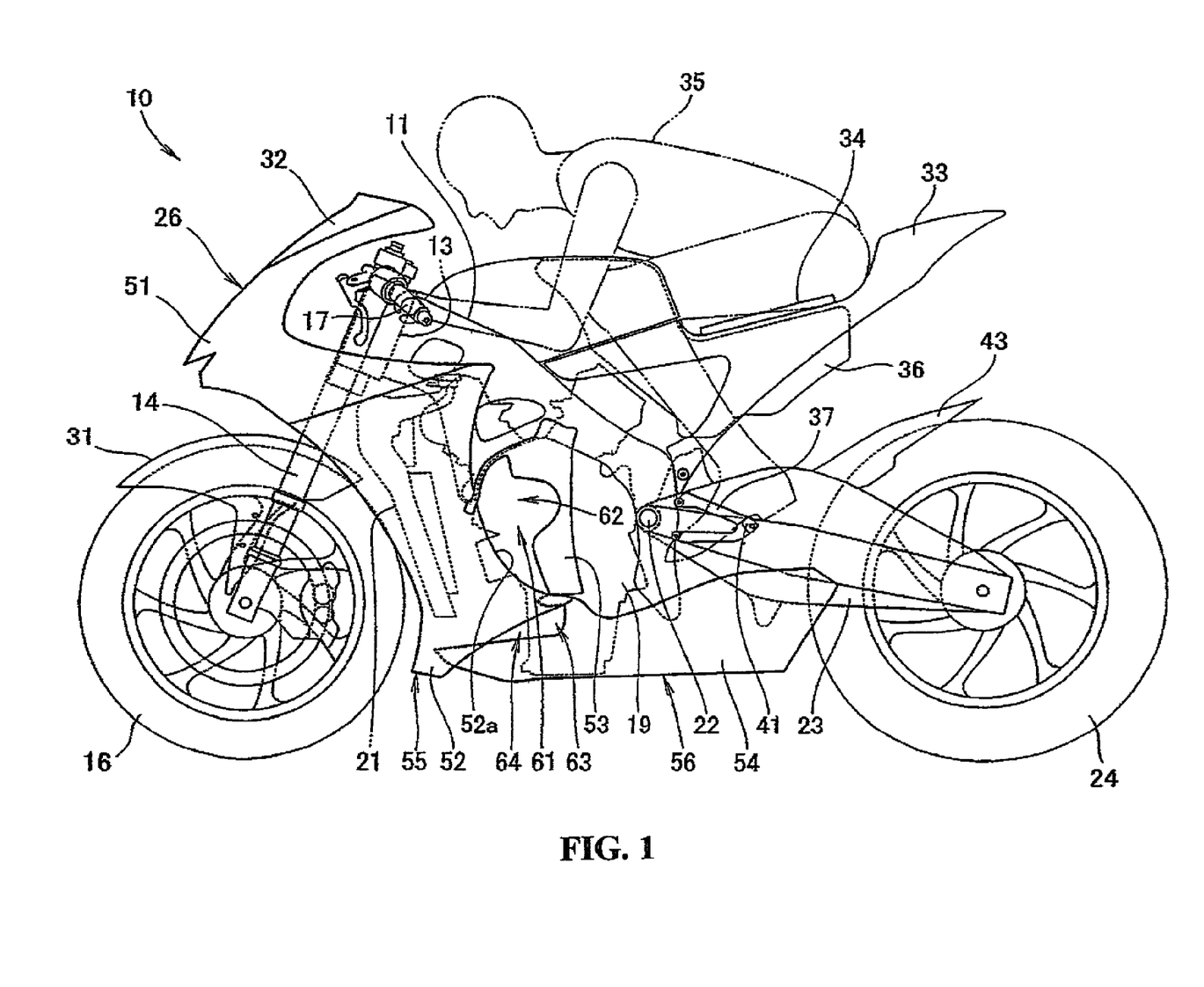
FIG. 1 is a side view of a motorcycle which adopts the cowling structure according to the present invention.

FIG. 1 is a side view of a motorcycle which adopts the cowling structure according to the present invention. A motorcycle 10 is a vehicle that is provided with a pair of left and right main frames 11 and 12 (only reference numeral 11 on the rider's side is shown in the drawing), a front fork 14 steerably mounted on a head pipe 13 provided on front ends of the main frames 11 and 12, a front wheel 16 mounted on a lower end of the front fork 14, a pair of left and right handlebars 17 and 18 (only reference numeral 17 on the rider's side is shown in the drawing) mounted on an upper end of the front fork 14, a V-type two-cylinder engine 19 with a transmission mounted on lower portions of the main frames 11 and 12, a radiator 21 disposed behind the front wheel 16 and in front of the engine 19 for cooling the engine 19, a swing arm 23 mounted on rear lower portions of the main frames 11 and 12 through a pivot shaft 22 in a vertically swingable manner, a rear wheel 24 mounted on a rear end of the swing arm 23, and a cowling 26 (a component indicated by a bold line) for covering a front portion and a lower portion of a vehicle body.

FIG. 1 illustrates a front fender 31 for covering an upper portion of the front wheel 16, a windshield 32 provided on a front upper portion of the cowling 26, a seat cowl 33 mounted on upper portions of the main frames 11 and 12, a seat 34 on which a rider 35 sits, a fuel tank 36 disposed inside the seat cowl 33, a pair of left and right step brackets 37 and 38 (only reference numeral 37 on the rider's side is shown in the drawing) respectively mounted on rear lower portions of the main frames 11 and 12, a pair of left and right steps 41 and 42 (only reference numeral 41 on the rider's side is shown in the drawing) respectively mounted on the step brackets 37 and 38, and a rear fender 43 mounted on the swing arm 23 for covering an upper portion of the rear wheel 24.

The cowling 26 is composed of an upper cowl 51 for covering the front of the handlebars 17 and 18, and the front and both sides of the front fork 14, a middle cowl 52 mounted on the lower portion of the upper cowl 51 for covering both sides of the front fork 14, both sides of the radiator 21, and both sides of the front portion of the engine 19, an inner cowl 53 mounted on a rear portion of the middle cowl 52 and the engine 19 for covering both sides of the engine 19, and a lower cowl 54 mounted on a lower portion of the middle cowl 52 and lower portions of the main frames 11 and 12 for covering both sides and a lower side of the lower portion of the vehicle body.

The middle cowl 52 is a component that is adapted for ensuring a space 61 described later by positioning a rear end 52a thereof further forward than ever before.

The inner cowl 53 is a component that is disposed in the rear of the middle cowl 52 through the space 61 and disposed in front of the steps 41 and 42.

The space 61 is formed within an opening 62 enclosed by the middle cowl 52 and the inner cowl 53.

The lower cowl 54 is a component that is disposed on the lower side of the vehicle body, with a front portion mounted on a lower end of the middle cowl 52, an intermediate upper portion mounted on lower portions of the main frames 11 and 12, and a rear end extending to an intermediate side of the swing arm 23. A space 63 shown in the drawing is formed within an opening 64 enclosed by the middle cowl 52 and the lower cowl 54.

The above-described upper cowl 51 and middle cowl 52 are components that compose a main cowling 55. The inner cowl 53 and the lower cowl 54 are components that compose a sub cowling 56.

Figure 2:
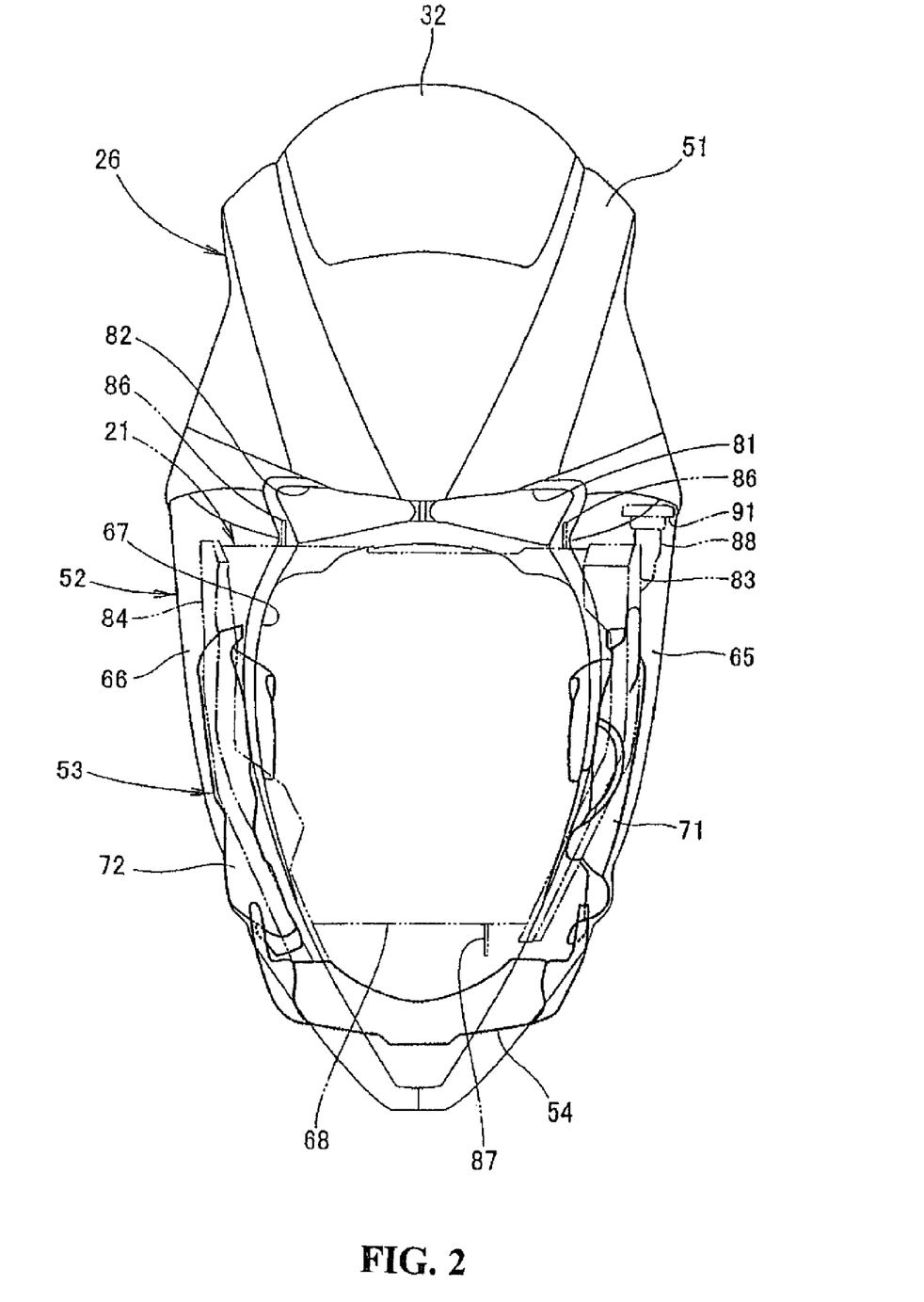
FIG. 2 is a front view of a cowling according to the present invention.

FIG. 2 is a front view of the cowling according to the present invention. The middle cowl 52 is composed of a left middle cowl 65 and a right middle cowl 66. An opening portion 67 serving as an air intake into the cowling 26 is formed inside the left middle cowl 65 and the right middle cowl 66. A core 68 serving as a heat exchange portion of the radiator 21 faces the opening portion 67. A left inner cowl 71 and a right inner cowl 72 composing the inner cowl 53 (a portion indicated by a bold line) are disposed on either side in the rear of the radiator 21. The lower cowl 54 is disposed in the rear of the middle cowl 52 and on the lower side of the inner cowl 53. In the drawing, the inner cowl 53 and the lower cowl 54 are illustrated in perspective with respect to the middle cowl 52 for facilitating the understanding of the positions thereof.

FIG. 2 illustrates openings 81 and 82 provided on the upper cowl 51 for mounting head lamps, tanks 83 and 84 provided on either side of the core 68 for composing the radiator 21, mounting portions 86, 86, and 87 for mounting the radiator 21 on the vehicle body, an injection port 88 for injecting cooling water into the tank 83, and a radiator cap 91 provided on the injection port 88.

FIGS. 3(a) and 3(b) are explanatory views of the inner cowl according to the present invention. FIG. 3(a) is a front view, and FIG. 3(b) is a side view. Since the left inner cowl 71 and the right inner cowl 72 (see FIG. 2) are substantially bilaterally symmetric components, only the left inner cowl 71 will be explained below. An arrow FRONT in FIG. 3(b) indicates the front of the vehicle (the same definition shall apply hereinafter).

Referring to FIGS. 3(a) and 3(b), the left inner cowl 71 is composed of a side plate portion 95 extending in the vertical direction, and an upper extension portion 96 extending forward and obliquely downward from an upper portion of the side plate portion 95.

The side plate portion 95 is provided with a semicircular cutout 97 for forming the space 61 (see FIG. 1) on a front portion of an intermediate portion thereof and is inclined to be formed so that a rear edge portion 95b is positioned on the outer side than a front edge portion 95a, except for a side swelling portion 98 provided on a lower portion of the side plate portion 95. On a corner of an upper portion of the side plate portion 95, and on a lower portion of the side plate portion 95, engine mounting holes 101 and 102 for mounting the side plate portion 95 on a side face of the engine 19 (see FIG. 1) are provided. By inclining the side plate portion 95 in this manner, a traveling wind can be directionally changed to be directed gradually away from the vehicle body, and can be straightened.

The side swelling portion 98 is provided for partly introducing the traveling wind into the inside of the left inner cowl 71 to cool a portion of the engine 19.

The upper extension portion 96 is an elongate plate-like portion formed integrally with the side plate portion 95. One edge of the upper extension portion 96 is provided with a standing wall 107 for reinforcement. The tip end of the standing wall 107 is provided with a middle cowl mounting hole 108 for mounting the middle cowl 52 (see FIG. 1) thereon.

Figure 4:
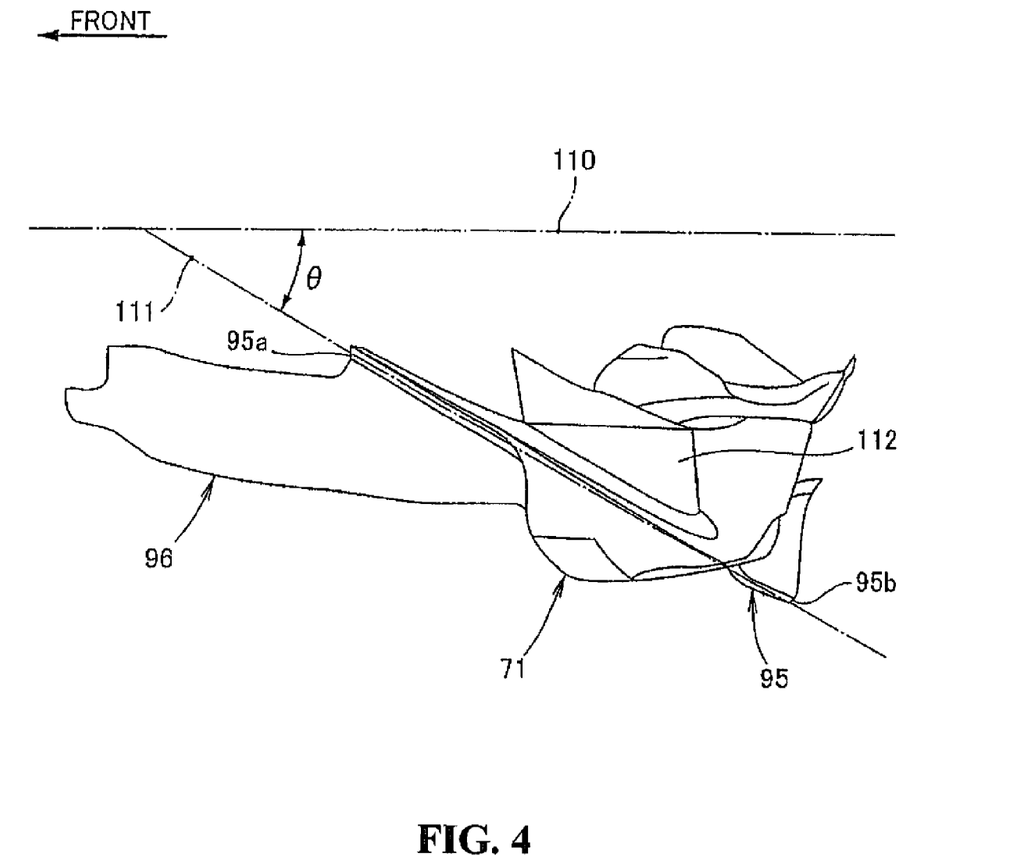
FIG. 4 is a plan view of the inner cowl according to the present invention.

FIG. 4 is a plan view of the inner cowl according to the present invention, in which the side plate portion 95 of the left inner cowl 71 is inclined to be disposed so that the distance from the center of vehicle width is gradually increased from the front of the vehicle body to the rear thereof, namely, the rear edge portion 95b of the side plate portion 95 is disposed on the outer side of the vehicle body than the front edge portion 95a thereof. Also, FIG. 4 illustrates a straight line 110 extending in the longitudinal direction of the vehicle body, a straight line 111 drawn along the side plate portion 95, an edge wall 112 raised from the edge of the cutout 97 of the side plate portion 95, and an inclination angle θ of the straight line 111 to the straight line 110 (i.e., inclination angle of the side plate portion 95).

FIGS. 5(a) and 5(b) are explanatory views of the lower cowl according to the present invention. FIG. 5(a) is a plan view, and FIG. 5(b) is a side view.

Referring to FIG. 5(a), the lower cowl 54 is a bathtub-shaped component that is composed of a bottom wall 114 longitudinally extending in an elongated shape, a front inclination wall 115 and a rear inclination wall 116 respectively continuous in front and in the rear of the bottom wall 114, a left inclination wall 117 and a right inclination wall 118 connected to either side of the bottom wall 114, the front inclination wall 115, and the rear inclination wall 116, front mounting portions 121 and 122 extending in the lateral direction from the front inclination wall 115 for mounting the lower cowl 54 on a lower end portion of the middle cowl 52 (see FIG. 1), first upper mounting portions 123 and 124 respectively provided on upper portions of the left inclination wall 117 and the right inclination wall 118 for mounting the lower cowl 54 on a lower end portion of the middle cowl 52, and second upper mounting portions 126 and 127 respectively provided on upper portions of the left inclination wall 117 and the right inclination wall 118 for mounting the lower cowl 54 on a lower end portion of the main frames 11 and 12 (see FIG. 1).

Figure 5:
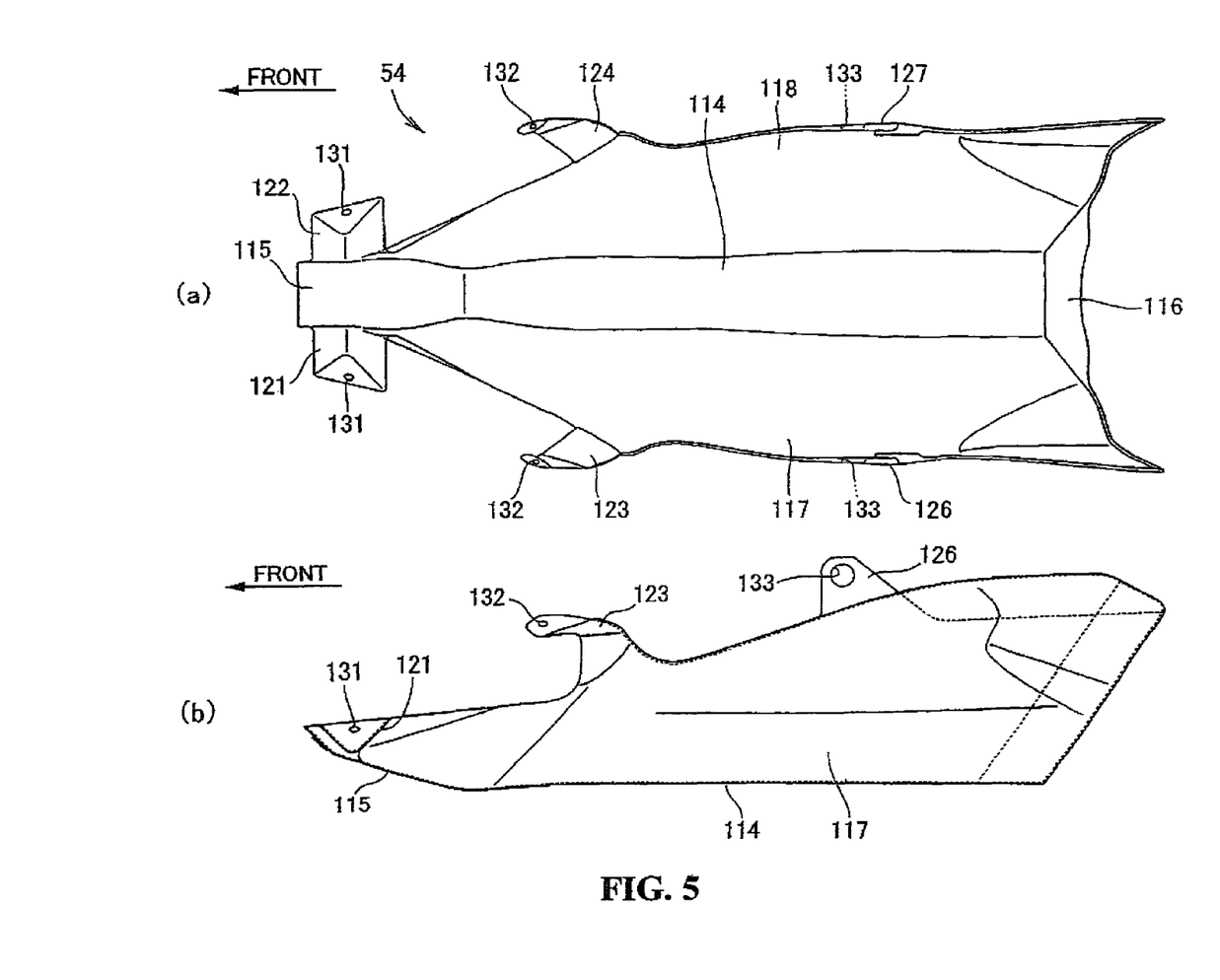
FIG. 5 are explanatory views of a lower cowl according to the present invention.

Also, FIG. 5 illustrate mounting holes 131 and 131 pierced in the front mounting portions 121 and 122, mounting holes 132 and 132 pierced in the first upper mounting portions 123 and 124, and mounting holes 133 and 133 pierced in the second upper mounting portions 126 and 127.

Referring to FIG. 5(b), the front mounting portions 121 and 122 (only reference numeral 121 on the rider's side is shown in the drawing) are inverted triangular portions in side view.

The first upper mounting portions 123 and 124 (only reference numeral 123 on the rider's side is shown in the drawing) are portions extending in an inverted L-shape upwardly from the left inclination wall 117 and the right inclination wall 118 in side view.

Next, the operation of the cowling structure described above will be explained.

Figure 6:
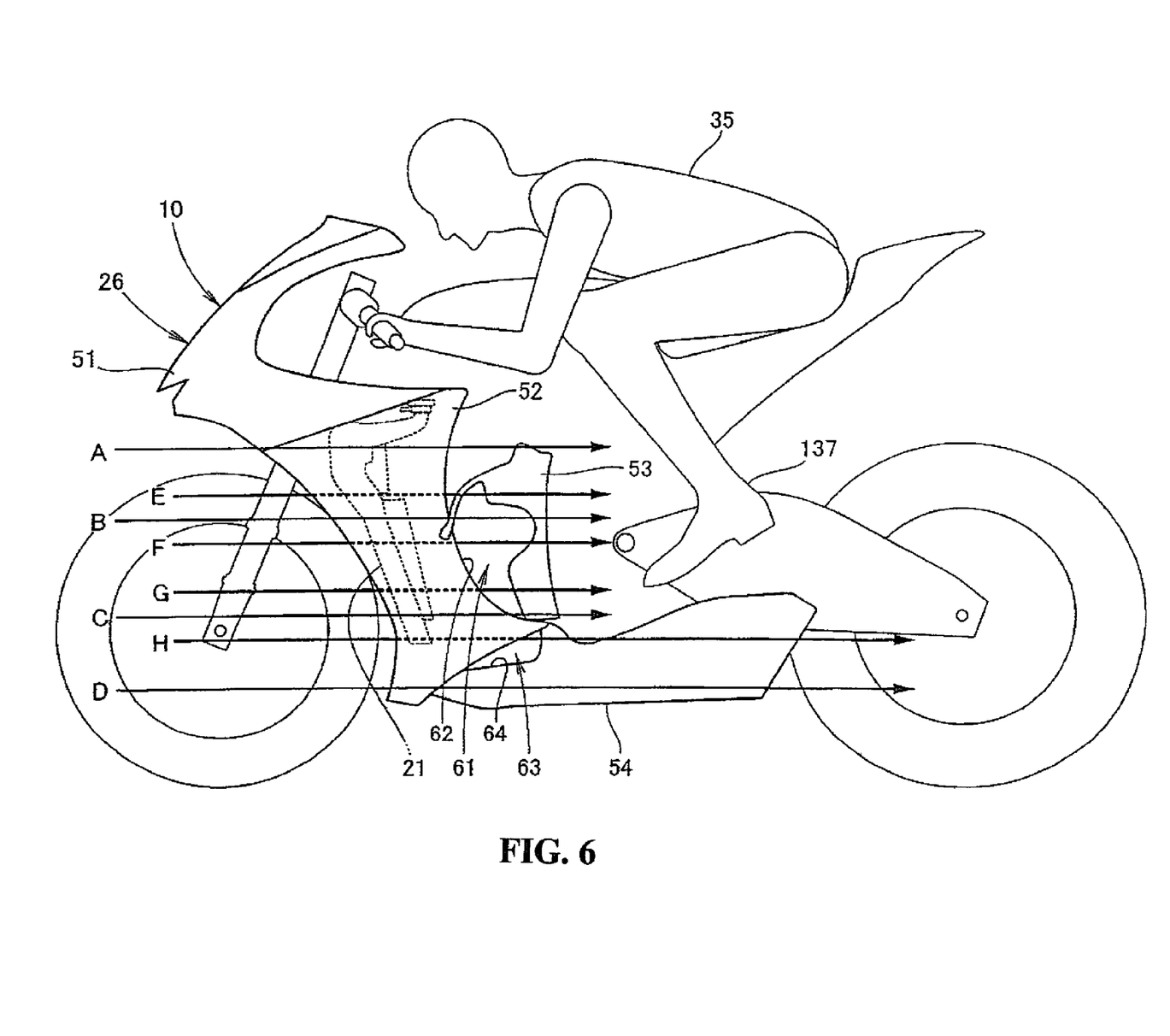
FIG. 6 is a first operational view showing the operation of the cowling structure according to the present invention.

FIG. 6 is a first operational view showing the operation of the cowling structure according to the present invention. During traveling of the motorcycle 10, the traveling wind flowing along a surface of the vehicle body is straightened by the cowling 26, as indicated by arrows A to D, and the traveling wind from the front of the vehicle is introduced into the inside of the cowling 26, as indicated by arrows E to H.

The exhaust wind passing through the radiator 21, out of the traveling wind flowing into the middle cowl 52, flows from the inside of the middle cowl 52 to the outside of the inner cowl 53 through the space 61 to be straightened, as indicated by arrows E to Q and flows further rearwardly. Also, the exhaust wind passing through the radiator 21 flows, as indicated by an arrow H, from the inside of the middle cowl 52 to the outside of the lower cowl 54 through the space 63 to be straightened, and flows further rearwardly.

When the traveling wind is straightened by the cowling 26 as described above, the straight traveling characteristic of the motorcycle 10 can be enhanced, and the air resistance can be reduced. In particular, by straightening the warm exhaust wind passing through the radiator 21 using the inner cowl 53 and the lower cowl 54, the flow velocity of the wind passing through the radiator 21 is increased, and thus it is possible to allow a lot of wind to hit the radiator 21. Therefore, cooling effect can be enhanced.

Figure 7:
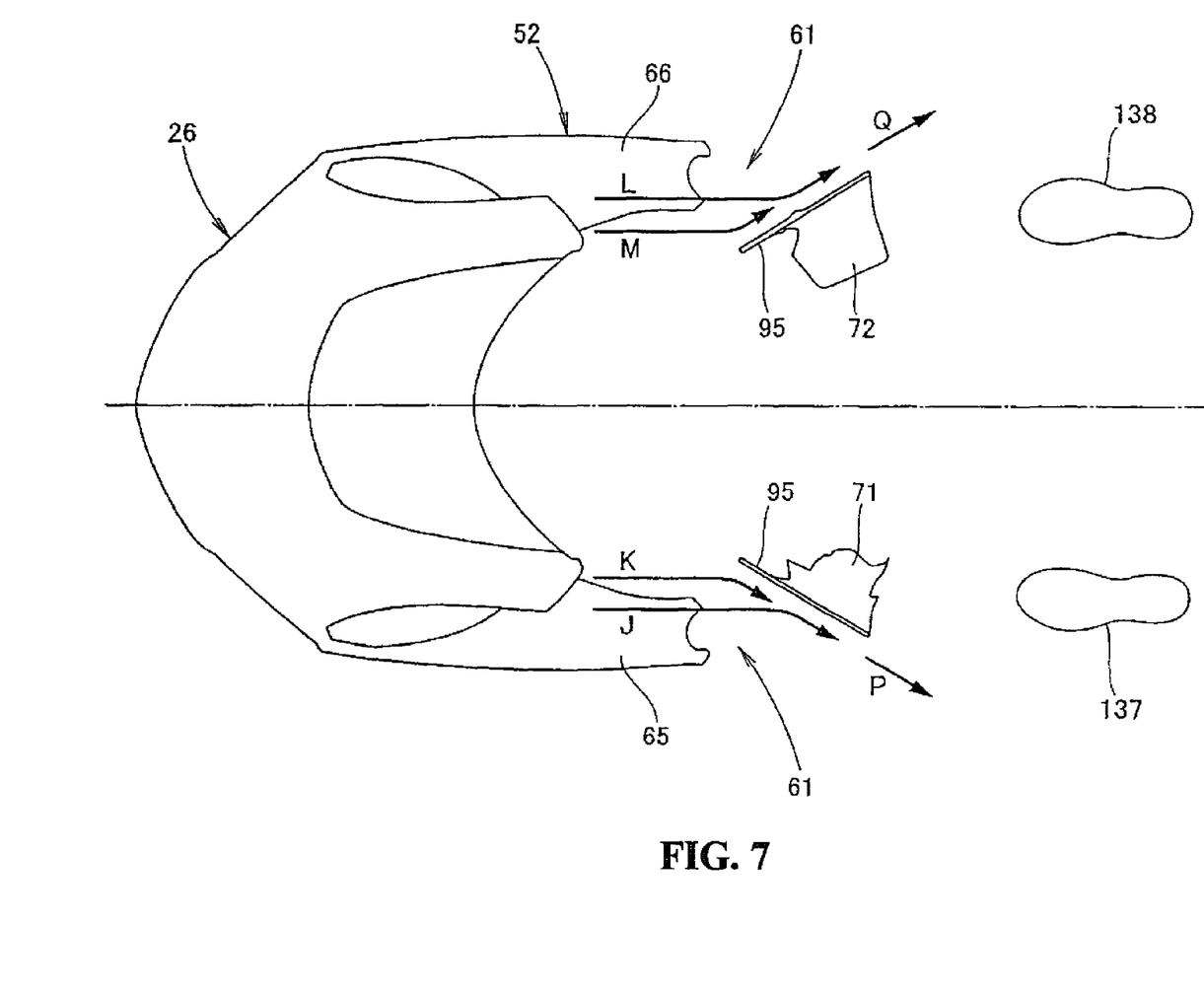
FIG. 7 is a second operational view showing the operation of the cowling structure according to the present invention.

FIG. 7 is a second operational view (plan view) showing the operation of the cowling structure according to the present invention, in which planar shapes of the left inner cowl 71 and the right inner cowl 72 are simplistically illustrated.

The exhaust wind passing through the radiator in the middle cowl 52 and flowing out to the space 61 is directionally changed to be directed to the rear oblique side by the respective side plate portions 95 of the left inner cowl 71 and the right inner cowl 72 as indicated by arrows J, K, L, and M, and flows as indicated by arrows P and Q.

Thus, the exhaust wind passing through the radiator is prevented from hitting left and right foot portions 137 and 138 of the rider respectively disposed on the rear portions of the left inner cowl 71 and the right inner cowl 72.

FIGS. 8(a) to 8(c) are third operational views showing the operation of the cowling structure according to the present invention. FIG. 8(a) shows a state in which the motorcycle 10 travels in an upright attitude (that is, a state in which the motorcycle 10 travels in a straight direction). In the drawing, profiles of the left inner cowl 71 and the right inner cowl 72 are indicated by bold lines (indicated in the same manner hereinafter).

When, in order to begin cornering from the above-described state, the motorcycle 10 is inclined to one side as shown in FIG. 8(c) after the state shown in FIG. 8(b), the traveling wind flowing along the cowling 26 or the traveling wind hitting the cowling 26 from the side of the vehicle as indicated by arrows A to D in FIG. 6 flows, as shown in FIG. 8(b), to the inside of the cowling 26 as indicated by an arrow R from the space 61 on the cornering side, and flows to the outside from the inside of the cowling 26 through another space 61 as indicated by an arrow S. Thus, the air resistance upon inclining the motorcycle 10 on a side can be reduced and hence, the motorcycle 10 can be inclined with a smaller force.

For example, when the space 61 is not provided, the straight traveling characteristic of the vehicle is further enhanced by the cowling. In this case, however, the traveling wind flowing along a surface of the cowling or the traveling wind hitting the cowling from the side of the vehicle is hardly released in the lateral direction of the vehicle body, and therefore, the air resistance when inclining the vehicle body is further increased. Since the traveling wind tends to flow further along the cowling with an increase in the vehicle speed, the above-described tendency is increased, namely, the inclining of the vehicle body is hardly performed.

With respect to the cowling according to the present invention, on the other hand, while ensuring the straight traveling characteristic of the motorcycle 10, the inclining of the vehicle body during cornering can be performed with a smaller force by the presence of the left and right spaces 61 and 61, and hence, even when the vehicle speed is increased, it is possible to suppress the increase of the air resistance at the time of inclining the vehicle body. Therefore, it is possible to perform the inclining of the vehicle body more quickly. Further, when the vehicle travels on a zigzag road (so-called winding road) for a long time, more comfortable traveling can be performed.

As described above in conjunction with FIGS. 1, 6, and 8, firstly, the present invention is characterized in that, in the motorcycle 10 with the radiator 21 disposed behind the front wheel 16, including the main cowling 55 (that is, the upper cowl 51 and the middle cowl 52) serving as a cowling for covering the periphery of the radiator 21 from the front of the handlebars 17 and 18, the sub cowling 56 (that is, the inner cowl 53 and the lower cowl 54) that is a separate body from the main cowling 55 is provided in the rear of the main cowling 55 through the spaces 61 and 63.

Figure 8:
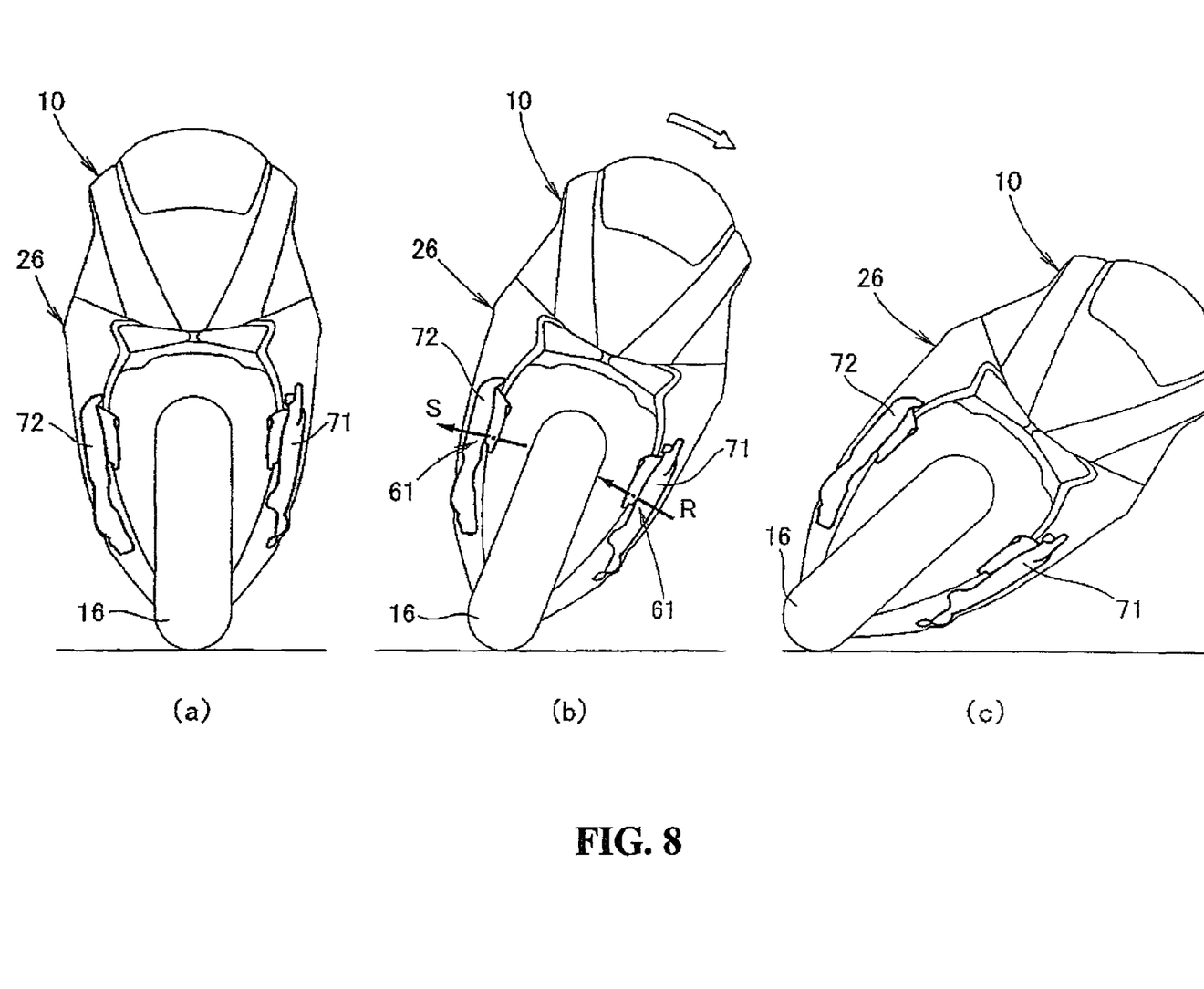
FIG. 8 are third operational views showing the operation of the cowling structure according to the present invention.

Thus, when the vehicle body is inclined at the time of cornering, the wind is released in the lateral direction of the vehicle body through the spaces 61 and 63. Therefore, the air resistance can be reduced, and the inclining to the lateral direction of the vehicle body can be performed with a smaller force. Also, even when the projected area of the side face of the main cowling 55 for covering the periphery of the radiator 21 is reduced, the exhaust wind passing through the radiator 21 can be straightened by the sub cowling 56, and the flow velocity of the wind passing through the radiator 21 is increased, thereby allowing the wind to effectively hit the radiator 21.

Secondly, the present invention is characterized in that the sub cowling 56 is disposed on a lower portion of the vehicle body, and in that the vehicle body front portion of the sub cowling 56 is disposed with a portion thereof overlapped with a lower portion of the main cowling 55 in side view below the radiator 21.

By such constitution, the exhaust wind passing through the radiator 21 to flow around the lower portion of the vehicle body is allowed to smoothly flow from the main cowling 55 to the sub cowling 56, and it is possible to enhance straightening effect, thereby further reducing the air resistance during traveling.

Figure 3:
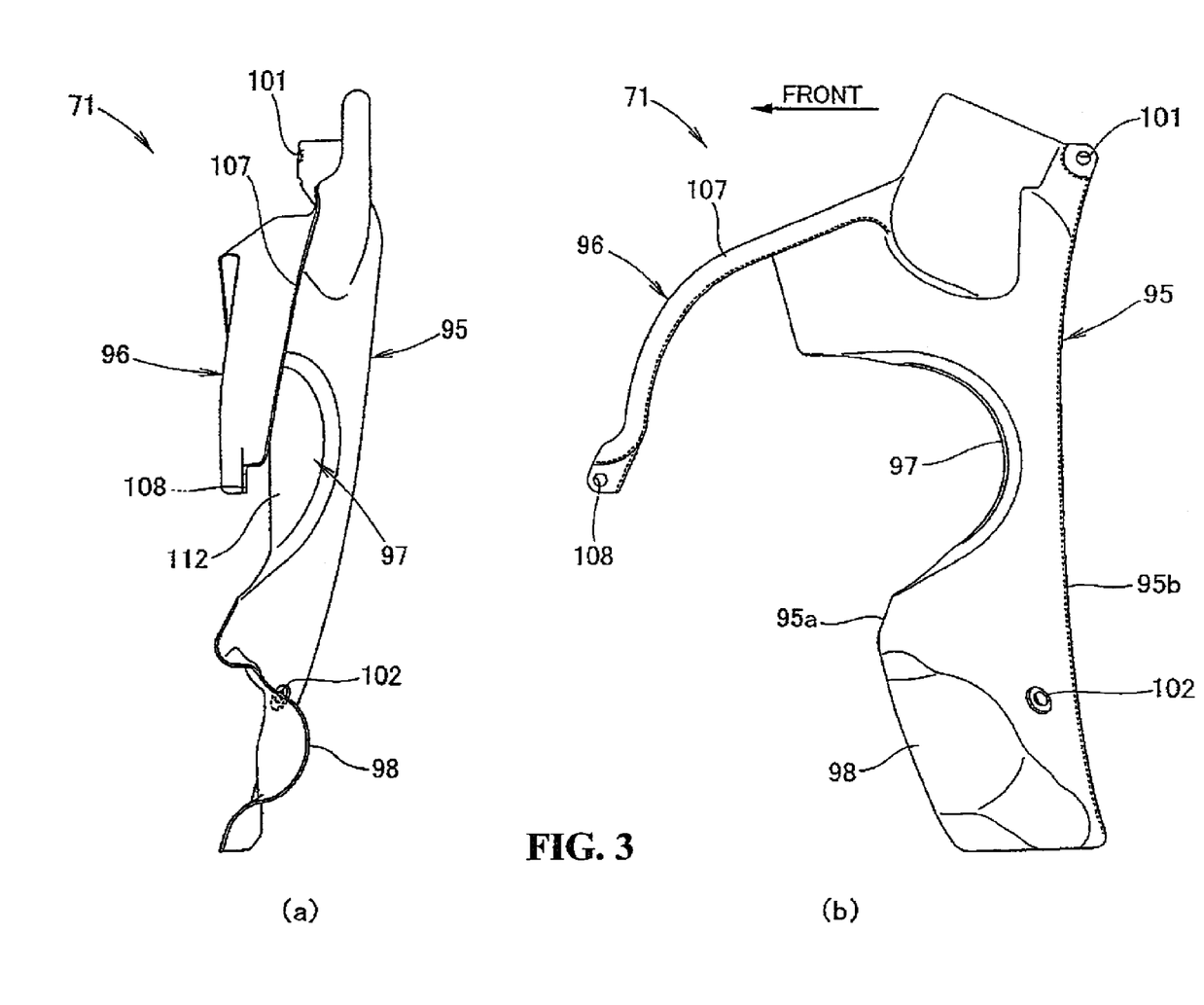
FIG. 3 are explanatory views of an inner cowl according to the present invention.

Thirdly, as shown in FIGS. 1 and 3, the present invention is characterized in that the sub cowling 56, (that is, the left inner cowl 71 and the right inner cowl 72) is provided in front of the foot portions 137 and 138 of the rider 35, and are inclined to be disposed so that the distance from the vehicle width center is increased gradually from the front of the vehicle body to the rear thereof.

Thus, the exhaust wind passing through the radiator 21 can be directionally changed to be directed to the rear oblique side by the left inner cowl 71 and the right inner cowl 72, thereby preventing the exhaust wind passing through the radiator 21 from hitting the foot portions 137 and 138 of the rider 35.

The cowling structure according to the present invention is suitable for motorcycles, and in particular, for racing vehicles.

We claim:

1. A cowling structure for a motorcycle in which a radiator is disposed behind a front wheel of the motorcycle, said cowling structure comprising:
a main cowling covering a periphery of the radiator from a front of a handlebar;
a sub cowling arranged to the rear of radiator, comprising an inner cowling mounted on a rear portion of the main cowling and a lower cowling mounted on a lower portion of main cowling, and
a space formed within an opening enclosed by the main cowling and the inner cowling that separates the sub cowling from the main cowling,
wherein the sub cowling is disposed in front of foot portions of a rider, and is inclined so that a distance from a vehicle width center is increased gradually from the front of the vehicle body to the rear thereof,
wherein the inner cowling has a front edge portion, viewed in the width-wise direction of the motorcycle, arranged at a position inside of a rear edge of the main cowling, and the inner cowling comprises a side plate portion extending in a vertical direction and an upper extension portion extending forward and obliquely downward from an upper portion of the side plate portion,
wherein the side plate portion comprises a cutout portion and the cutout portion forms a portion of the space on a front portion of the side plate portion of the inner cowl, and
wherein exhaust wind passing through the radiator in the main cowling and flowing to the space is directionally changed to be directed to a rear oblique side of the motorcycle by the inner cowling.

2. The cowling structure for the motorcycle according to claim 1,
wherein the sub cowling is disposed on a lower portion of a vehicle body, and a vehicle body front portion of the sub cowling is disposed, with a portion thereof overlapped with a lower portion of the cowling in side view below the radiator.

3. The cowling structure for the motorcycle according to claim 1, wherein the main cowling comprises:
an upper cowl for covering the front of the handlebar and the front and both sides of a front fork of said motorcycle; and
a middle cowl mounted on a lower portion of the upper cowl for covering both sides of the front fork, both sides of the radiator, and both sides of a front portion of an engine.

4. The cowling structure for the motorcycle according to claim 1, wherein:
the inner cowl is mounted on a rear portion of a middle cowl and the engine for covering both sides of the engine, and
the lower cowl is mounted on a lower portion of the middle cowl and lower portions of the main frames of said motorcycle,
wherein the lower cowl covers both sides and a lower side of the lower portion of said motorcycle.

* * * * *